United States Patent
Otaka et al.

(10) Patent No.: US 7,206,145 B2
(45) Date of Patent: Apr. 17, 2007

(54) LENS DRIVING DEVICE AND ELECTRONIC CAMERA USING THE SAME

(75) Inventors: Hiroyuki Otaka, Saitama (JP); Ryota Sasaki, Saitama (JP)

(73) Assignees: Fujifilm Corporation, Tokyo (JP); Fujinon Corporation, Saitama (JP)

( * ) Notice: Subject to any disclaimer, the term of this patent is extended or adjusted under 35 U.S.C. 154(b) by 0 days.

(21) Appl. No.: 11/230,615

(22) Filed: Sep. 21, 2005

(65) Prior Publication Data

US 2006/0061890 A1  Mar. 23, 2006

(30) Foreign Application Priority Data

Sep. 22, 2004  (JP)  ............. 2004-274889

(51) Int. Cl.
*G02B 7/02* (2006.01)
*G02B 15/14* (2006.01)

(52) U.S. Cl. .............. 359/824; 359/694; 359/696; 359/823

(58) Field of Classification Search ........... 359/823, 359/824, 694–700; 396/80; 353/101; 250/201.4
See application file for complete search history.

(56) References Cited

U.S. PATENT DOCUMENTS

| | | | |
|---|---|---|---|
| 4,596,449 A | 6/1986 | Iwata et al. | |
| 4,605,286 A | 8/1986 | Sumi | |
| 4,697,891 A * | 10/1987 | Kawai | ......... 359/694 |
| 6,072,642 A * | 6/2000 | Shirai | ......... 359/823 |
| 6,800,970 B2 | 10/2004 | Aoshima | |

FOREIGN PATENT DOCUMENTS

| | | |
|---|---|---|
| JP | 56-147132 A | 11/1981 |
| JP | 60-000417 A | 1/1985 |
| JP | 62-195615 A | 8/1987 |

\* cited by examiner

*Primary Examiner*—Loha Ben
(74) *Attorney, Agent, or Firm*—Sughrue Mion, PLLC (57) ABSTRACT

A circumferential surface of a lens holder is provided with a reflection member having different reflectance relative to a surrounding portion thereof. An opening is formed in an upper cover at a position confronting the reflection member at a time when the lens holder is kept in an original position being as a close-end position. The upper cover is provided with an optical position detector disposed so as to be adjacent to the opening. The optical position detector optically detects the reflection member via the opening when the lens holder is kept in the original position. Consequently, an original position of a taking lens held by the lens holder is detected.

12 Claims, 10 Drawing Sheets

LENS DRIVING DEVICE AND ELECTRONIC CAMERA USING THE SAME

BACKGROUND OF THE INVENTION

1. Field of the Invention

The present invention relates to a lens driving device for detecting an original position of a lens and for controlling a lens position, and further relates to an electronic camera using the lens driving device.

2. Description of the Related Art

In recent years, electronic cameras are widely used. This kind of the electronic camera is downsized and lightened for the purpose of improving portability. Moreover, it is general to install the electronic camera in a small-sized equipment of a cell-phone, a PDA (Personal Digital Assistant) and so forth. In such a case, it is required to further downsize and lighten the electronic camera. Thus, it is also desired to downsize a lens driving device to be employed in the electronic camera.

In order to solve the above problems, a lens driving device utilizing a hollow stepping motor is considered (see Japanese Patent Laid-Open Publication No. 60-417, for instance). This kind of the lens driving device comprises a lens holder for holding a lens, a hollow rotor disposed so as to cover the periphery of the lens holder, and a stator disposed so as to cover the periphery of the hollow rotor. By supplying a pulse current to the stator, the hollow rotor is rotated to move the lens holder in an optical-axis direction via a cam mechanism or the like. By unifying the stepping motor and a lens barrel, it is possible to downsize the lens driving mechanism.

Meanwhile, in the lens driving device, it is important to detect an original position of the lens for the purpose of accurately controlling a lens position. The original position of the lens is detected by an optical position detector of a photo interrupter (hereinafter, called as PI) and so forth. However, the lens driving device described in the above-noted Publication No. 60-417 has no space for disposing the optical detector of the PI and so forth. Consequently, if the original position is detected by using the optical position detector of the PI and so forth, there arises a problem in that the lens driving device becomes a large-size.

SUMMARY OF THE INVENTION

In view of the foregoing, it is a primary object of the present invention to provide a small-sized lens driving device in which an original position of a lens is detected and a lens position is accurately controlled.

It is a second object of the present invention to provide an electronic camera using the above-mentioned lens driving device.

In order to achieve the above and other objects, the lens driving device according to the present invention comprises a lens holder, a rotary barrel and a barrel holder. The lens holder has a cylindrical shape, and holds a lens. The rotary barrel is disposed so as to cover the lens holder, and is rotated around an optical axis of the lens. The barrel holder rotatably holds the rotary barrel from the outside thereof. The lens holder is moved in a direction of the optical axis by rotating the rotary barrel. The lens driving device further comprises a reflection member, an opening and an optical position detector. The reflection member is disposed at a circumferential surface of the lens holder. Reflectance of the reflection member is different from that of a surrounding portion of the reflection member. The opening is formed in the barrel holder at a position confronting the reflection member at a time when the lens holder has reached an original position. The optical position detector is disposed so as to be adjacent to the opening. The optical position detector optically detects the reflection member via the opening when the lens holder is kept in the original position.

In a case that the reflection member is covered with the rotary barrel at the time when the lens holder is kept in the original position, the rotary barrel is also provided with an opening formed at a position confronting the reflection member.

The lens driving device further comprises a stator held by the barrel holder, and a magnet. The stator has a cylindrical shape and generates magnetic fields therein. The magnet has a cylindrical shape and is fixed to the periphery of the rotary barrel. The rotary barrel is integrally rotated with the magnet by virtue of the magnetic field generated by the stator.

The electronic camera according to the present invention comprises the above-mentioned lens driving device, an imaging device and a memory. The imaging device takes a subject image, which is formed by the lens, to obtain image data. The memory stores the image data obtained by the imaging device.

In the lens driving device and the electronic camera according to the present invention, the reflection member is merely disposed inside the barrel holder. Thus, the lens driving device and the electronic camera may be downsized in comparison with a case in that an optical position detector is disposed inside the barrel holder to detect the original position of the lens. Further, since it is sufficient to form the opening in the barrel holder, the strength of the barrel holder is prevented from deteriorating.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
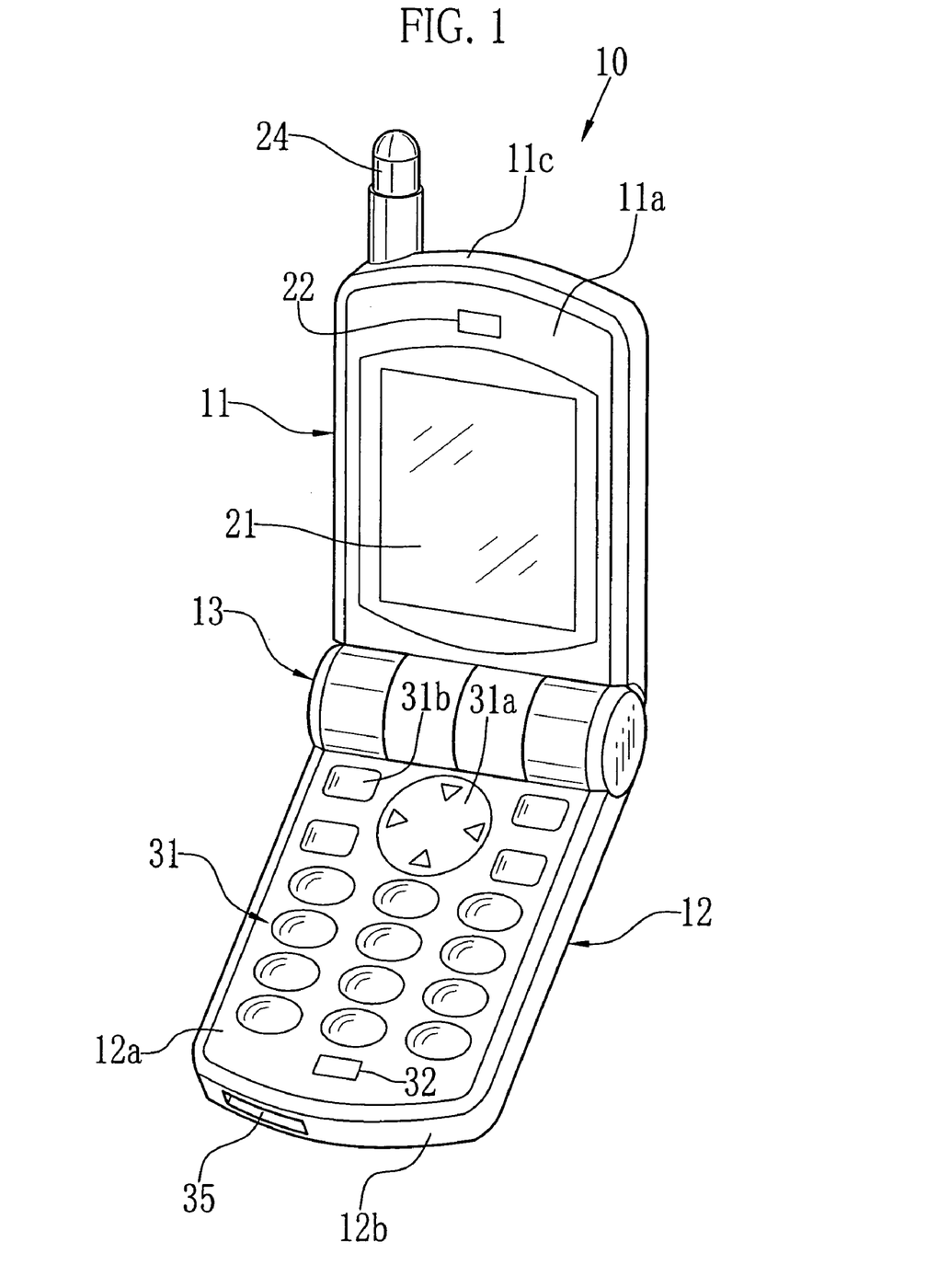
FIG. 1 is a perspective view showing a front side of a camera-equipped cell-phone.
Figure 2:
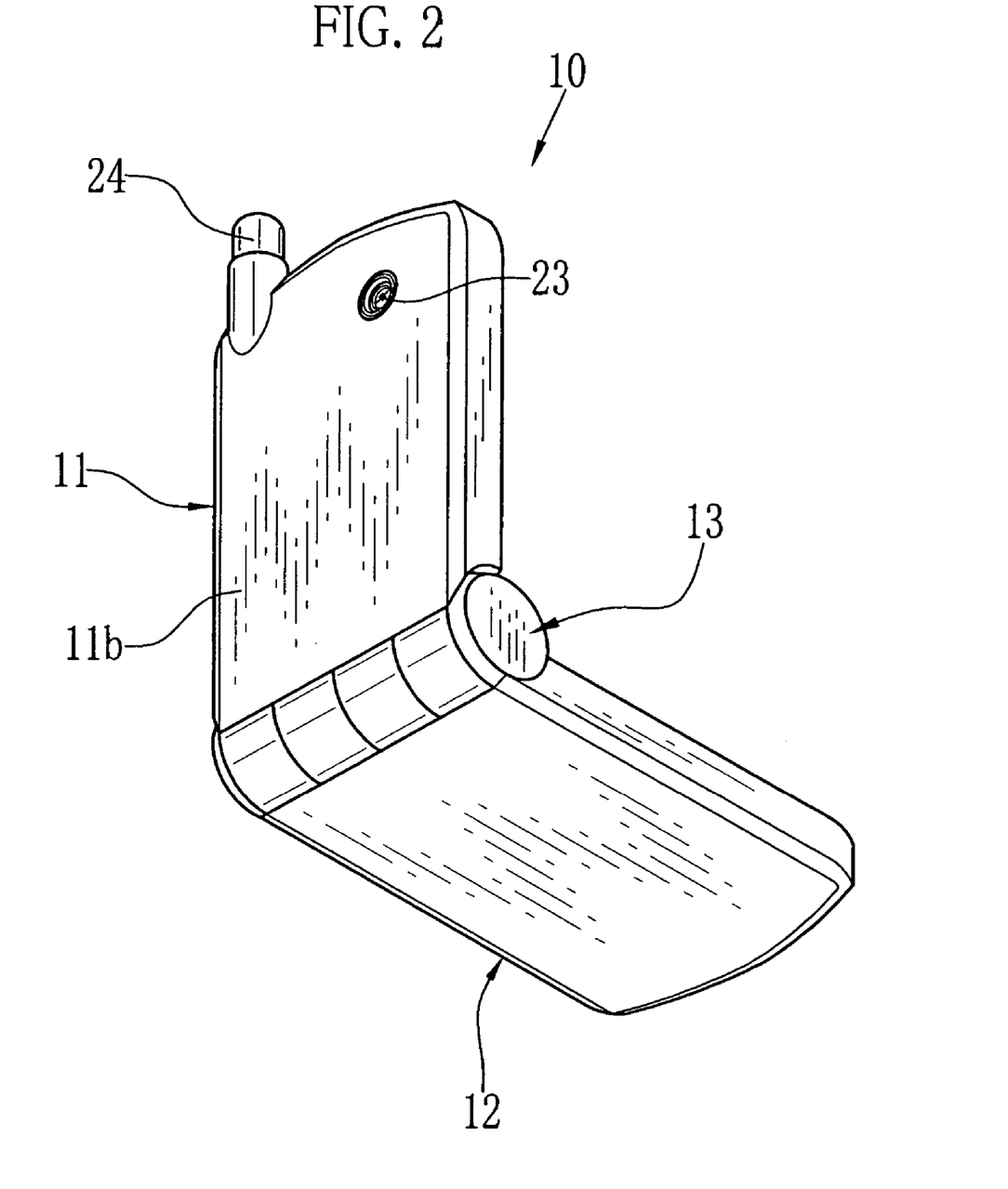
FIG. 2 is a perspective view showing a rear side of the camera-equipped cell-phone.

In this embodiment, a lens driving device according to the present invention is applied to a camera-equipped cell-phone. FIG. 1 is a perspective view showing a front side of the camera-equipped cell-phone 10, and FIG. 2 is a perspective view showing a rear side thereof. The camera-equipped cell-phone 10 comprises an upper body 11, a lower body 12 and a hinge 13 rotatably connecting these bodies 11 and 12.

The respective bodies 11 and 12 have a rectangular thin shape. The upper body 11 and the lower body 12 are rotated around the hinge 13 between an open position and a closed position. The open position is shown in FIGS. 1 and 2. In the closed position, the upper body 11 and the lower body 12 are folded so as to be parallel to each other.

The front 11a of the upper body 11 is provided with an LCD panel 21 and a speaker 22. A taking lens 23 is exposed at the rear 11b of the upper body 11. Moreover, the top 11c of the upper body 11 is provided with an antenna 24. The LCD panel 21 displays various menu pictures, images and varied information concerning telephone numbers and so forth of parties. The speaker 22 outputs a voice of the party, and the antenna 24 transmits and receives radio signals of voice data and other data concerning an e-mail and so forth.

The front 12a of the lower body 12 is provided with an operating portion 31 and a microphone 32. Moreover, the bottom 12b of the lower body 12 is provided with a slot 35 into which a recording medium of a memory card or the like is loaded. The operating portion 31 includes various operation buttons of a selection key 31a, a shutter button 31b and so forth. When a shooter selects a shooting mode from among a plurality of modes by operating the selection key 31a, the camera-equipped cell-phone 10 maintains a shootable state. Meanwhile, the microphone 32 converts the voice into an electrical signal.

Figure 3:
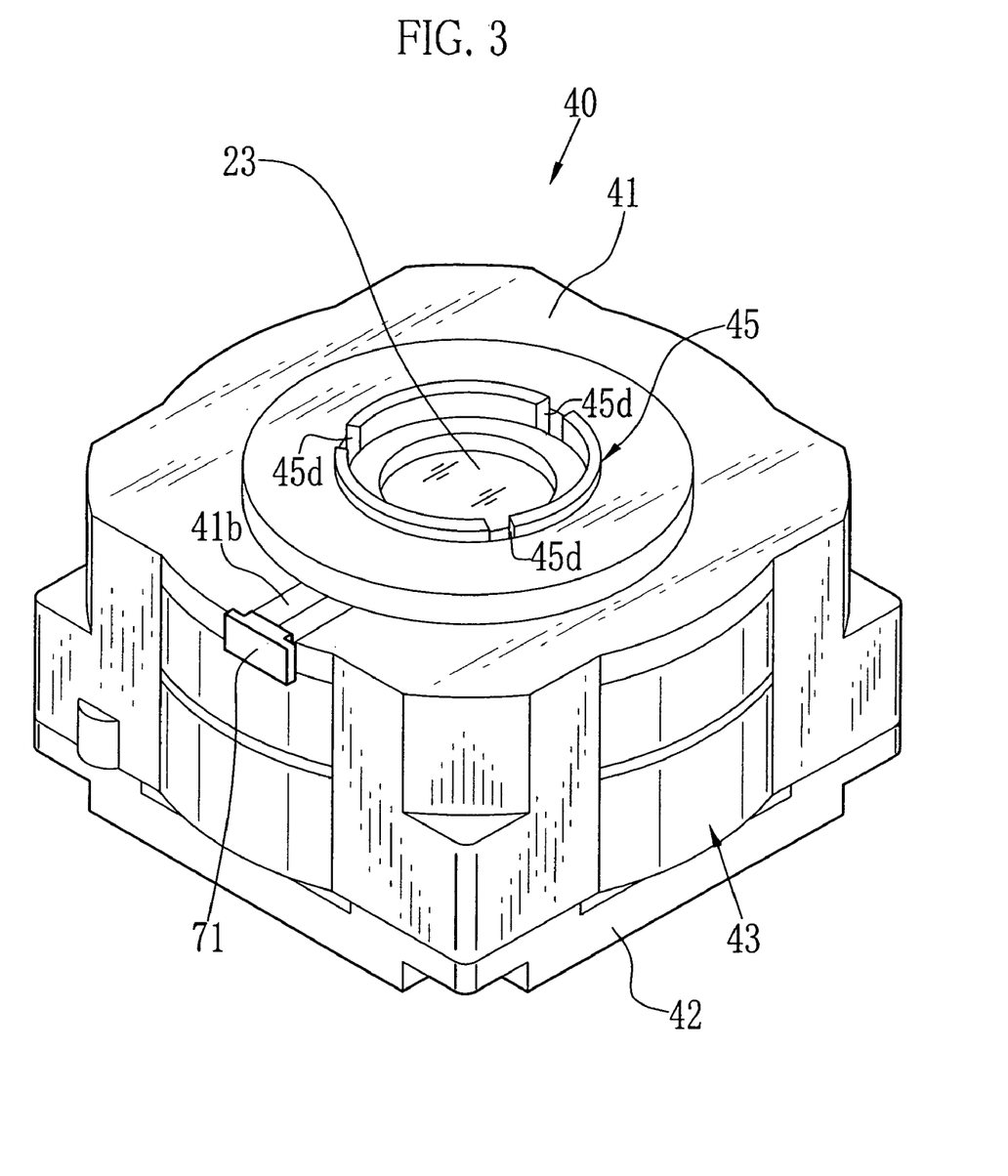
FIG. 3 is a perspective view showing a lens driving device.
Figure 4:
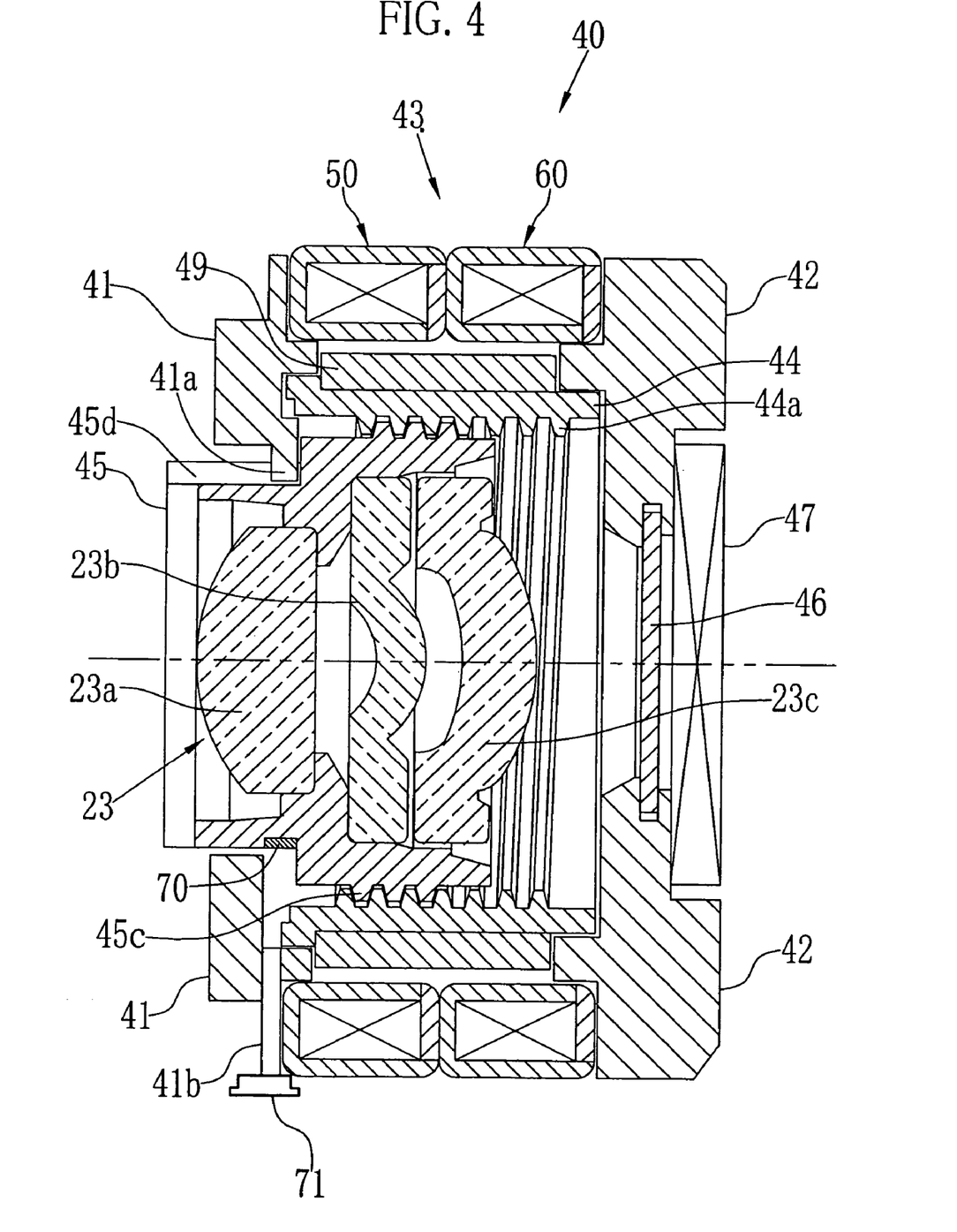
FIG. 4 is a section view showing a structure of the lens driving device.
Figure 5:
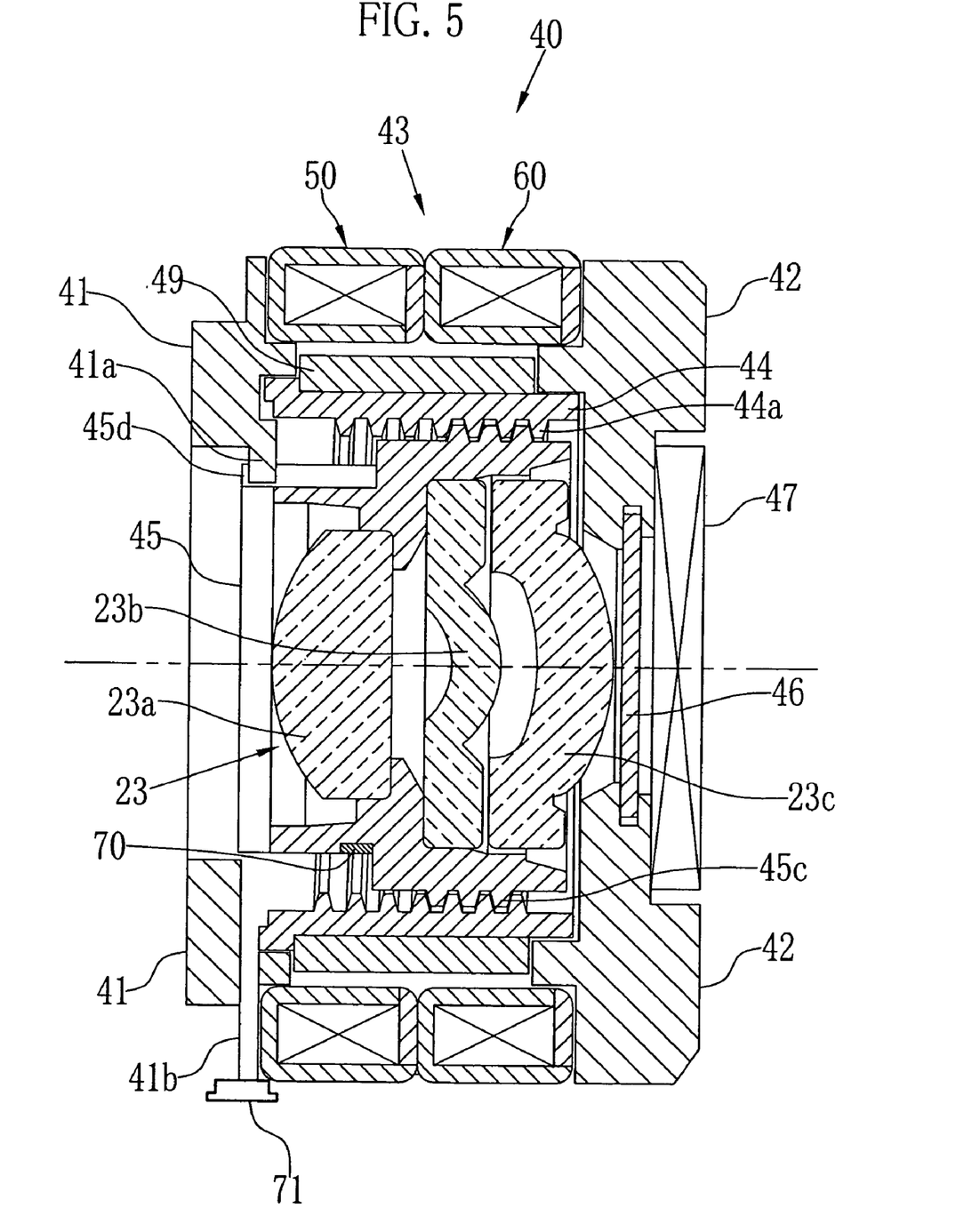
FIG. 5 is a section view showing the structure of the lens driving device.

The above-mentioned taking lens 23 is moved in an optical-axis direction by the lens driving device built in the upper body 11. A structure of the lens driving device is described below, referring to FIGS. 3 to 5. FIG. 3 is a perspective view showing the structure of the lens driving device 40. FIG. 4 is a section view of the lens driving device 40 of a time when the taking lens 23 is moved to a close end. FIG. 5 is a section view of the lens driving device 40 of a time when the taking lens 23 is moved to an infinity end.

The lens driving device 40 comprises an upper cover 41, a lower cover 42, a cylindrical stator 43, a rotary barrel 44 and a lens holder 45. The upper and lower covers 41 and 42 constitute a barrel holder. The stator 43 is held by the upper and lower covers 41 and 42. The rotary barrel 44 is disposed at the inside of the stator 43. The lens holder 45 is disposed at the inside of the rotary barrel 44 to hold the taking lens 23. The stator 43, the rotary barrel 44 and the lens holder 45 are integrally contained in the upper and lower covers 41 and 42 to unify the lens driving device 40.

Further, the lower cover 42 holds a low-pass filter 46 and a CCD 47 being as an imaging device. The low-pass filter 46 and the CCD 47 are disposed behind the taking lens 23. The low-pass filter 46 removes high-frequency components included in a subject light. In virtue of this, it is possible to reduce troubles of pseudo color, moire and so forth, since the subject light having passed through the taking lens 23 enters the CCD 47 via the low-pass filter 46. Incidentally, although the low-pass filter 46 and the CCD 47 are held by the lower cover 42, they may be disposed at the outside of the lens driving device 40.

Figure 6:
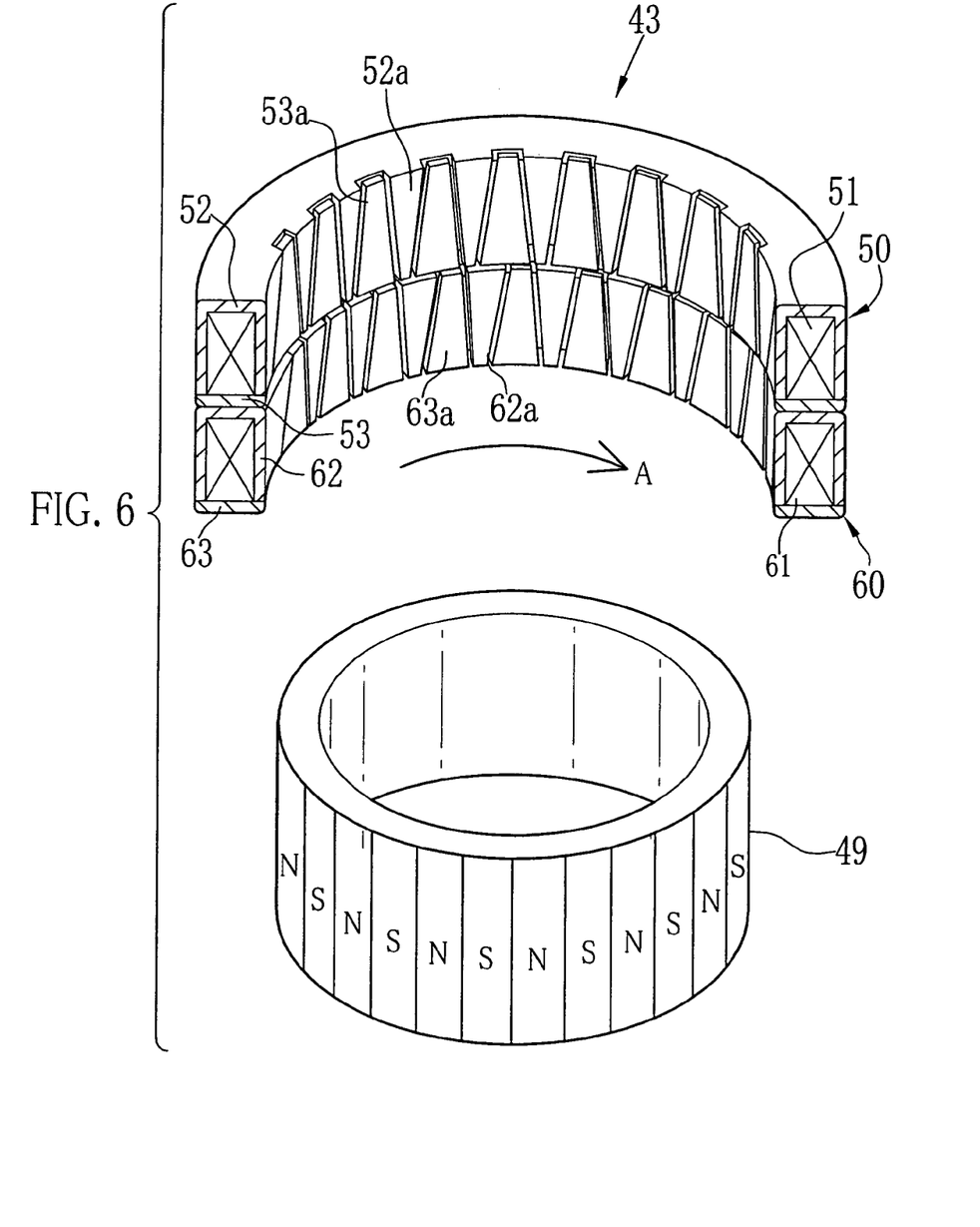
FIG. 6 is a perspective view showing a structure of a stator and a magnet.

The periphery of the rotary barrel 44 is provided with a cylindrical magnet 49. A structure of the stator 43 and the magnet 49 is described below. As shown in FIG. 6, the stator 43 comprises a first coil portion 50 and a second coil portion 60. The first coil portion 50 comprises a cylindrical coil 51 formed by winding a conductive wire, an upper coil cover 52 and a lower coil cover 53. The coil covers 52 and 53 are disposed so as to cover the coil 51. The whole of the first coil portion 50 has a cylindrical shape.

The upper coil cover 52 and the lower coil cover 53 are provided with teeth 52a and 53a, which are formed at an inner side of the first coil portion 50 so as to be alternately arranged. The teeth 52a and 53a have gaps so as not to come into contact with each other. Thus, when a current flows into the coil 51, the teeth 52a and 53a are magnetically polarized in reverse polarities.

In the above, the first coil portion 50 is described. The second coil portion 60 also has the similar structure and comprises a coil 61, an upper coil cover 62 and a lower coil cover 63. Moreover, the upper coil cover 62 is provided with a plurality of teeth 62a, and the lower coil cover 63 is provided with a plurality of teeth 63a. Incidentally, the second coil portion 60 is disposed such that the teeth 62a and 63a are shifted by half a pitch relative to the teeth 52a and 53a of the first coil portion 50.

A pulse current is adapted to flow in the respective coils 51 and 61 alternately. For example, when the pulse current is supplied to the coil 51 in a forward direction shown by an arrow A in the drawing, magnetic fields are generated at the periphery of the coil 51 in a clockwise direction relative to the flowing direction of the pulse current. Thus, lines of magnetic force are led from the upper coil cover 52 toward the lower coil cover 53. At this time, since the line of the magnetic force is led from the upper coil cover 52 to the lower coil cover 53 via the gap (through the air), the tooth 52a becomes the north pole and the tooth 53a becomes the south pole. Similarly, when the pulse current is supplied to the coil 61 in the forward direction, the teeth 62a becomes the north pole and the teeth 63a becomes the south pole.

Meanwhile, when the pulse current is supplied to the coil 51 in a backward direction, the opposite magnetic fields are generated at the periphery of the coil 51 in comparison with the case that the pulse current is supplied in the forward direction. At this time, the line of the magnetic force is led from the lower coil cover 53 to the upper coil cover 52 via the gap (through the air), the teeth 52a becomes the south pole and the teeth 53a becomes the north pole. Similarly, when the pulse current is supplied to the coil 61 in the backward direction, the teeth 62a becomes the south pole and the teeth 63a becomes the north pole. As described above, the magnetic poles of the north pole and the south pole are alternately generated at the inner sides of the first and second coil portions 50 and 60 by supplying the pulse current to the coil 51 and the coil 61.

The magnet 49 has a cylindrical shape of which an outer diameter is smaller than an inner diameter of the stator 43. The magnet 49 is a permanent magnet whose circumference is magnetized so as to alternately arrange the north pole and the south pole and so as to have forty eight poles. The magnet 49 is rotated relative to the stator 43 in virtue of repulsive force and attractive force, which are caused by the magnetic field generated at the time when the pulse current is supplied to the stator 43. The magnet 49 rotates stepwise, and a rotational angle of one step corresponds to one pole. The magnet 49 rotates by forty eight steps to make one rotation.

Next, control of the pulse current, which is performed for the respective rotational directions of the magnet 49, is described below. Similarly to the direction of the pulse current, the direction shown by the arrow A in the drawing is defined as a forward direction of the rotation of the magnet 49. A case for rotating the magnet 49 in the forward direction is described first.

When the magnet 49 is rotated in the forward direction, the pulse current is repeatedly supplied in an order of the forward direction of the coil 51, the forward direction of the coil 61, the backward direction of the coil 51 and the backward direction of the coil 61. By virtue of this, the teeth 52*a*, 62*a*, 53*a* and 63*a* become the north pole in this order. At the same time, the teeth 53*a*, 63*a*, 52*a* and 62*a* become the south pole in this order. The attractive force and the repulsive force are applied to the north pole and the south pole of the magnet 49 from the teeth 52*a*, 53*a*, 62*a* and 63*a* so that the magnet 49 is rotated in the forward direction.

Meanwhile, when the magnet 49 is rotated in the backward direction, the pulse current is repeatedly supplied in an order of the forward direction of the coil 51, the backward direction of the coil 61, the backward direction of the coil 51 and the forward direction of the coil 61. By virtue of this, the teeth 52*a*, 63*a*, 53*a* and 62*a* become the north pole in this order. At the same time, the teeth 53*a*, 62*a*, 52*a* and 63*a* become the south pole in this order. The attractive force and the repulsive force are applied to the north pole and the south pole of the magnet 49 from the teeth 52*a*, 53*a*, 62*a* and 63*a* so that the magnet 49 is rotated in the backward direction.

When the magnet 49 is rotated as described above, the rotary barrel 44 is integrally rotated with the magnet 49, since the rotary barrel 44 is rotatably supported by the upper cover 41 and the lower cover 42. In the meantime, a helicoid 44*a*, which is a helical groove, is formed on an inner surface of the rotary barrel 44.

Figure 7:
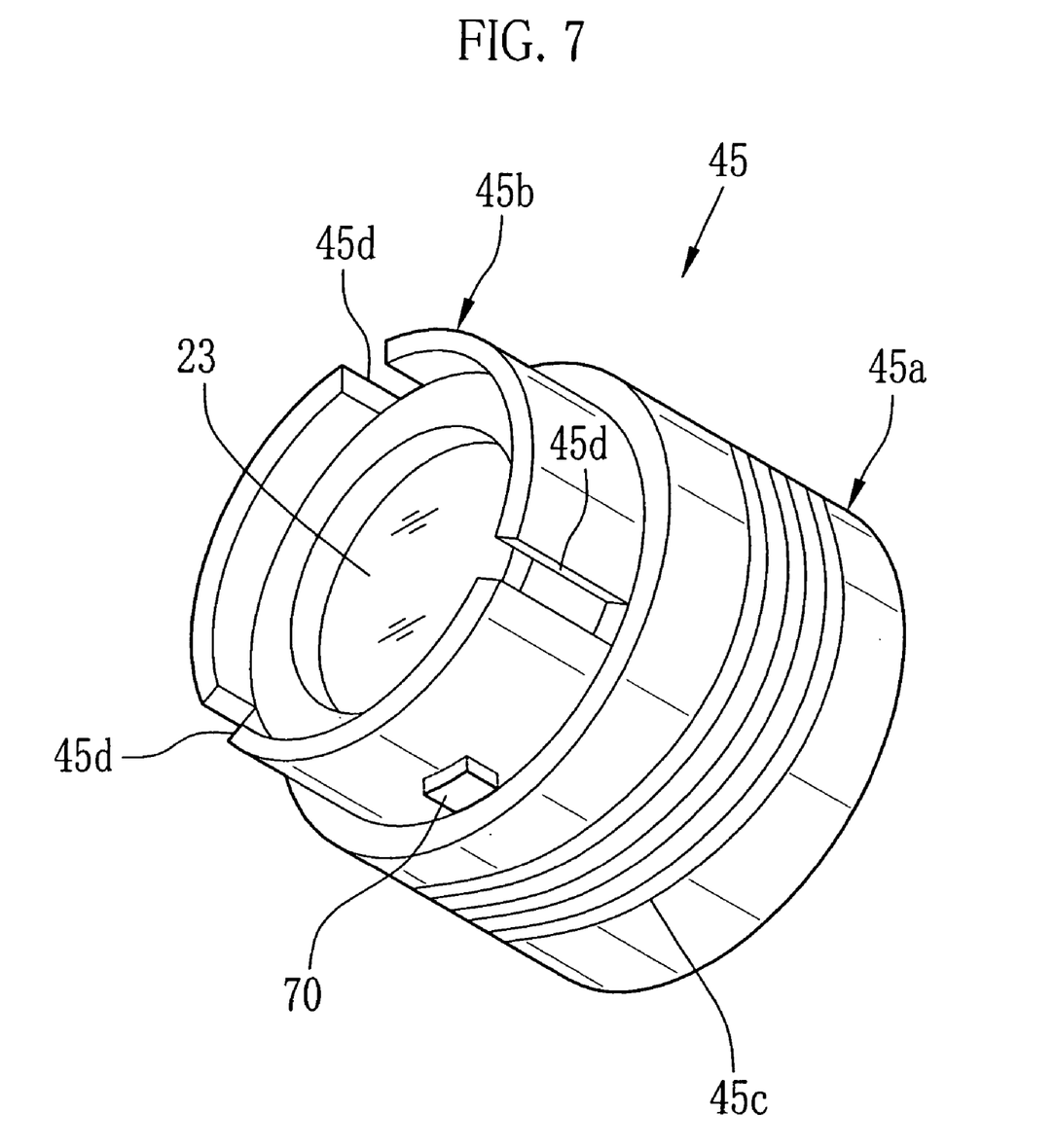
FIG. 7 is a perspective view showing a lens holder.

A structure of the lens holder 45 is described below. As shown in FIG. 7, the lens holder 45 is constituted of a main cylinder 45*a* and a front cylinder 45*b* integrally formed with the front of the main cylinder 45*a*. The front cylinder 45*b* has a shorter diameter in comparison with the main cylinder 45*a*. On a circumferential surface of the main cylinder 45*a*, a helicoid 45*c* is formed to mesh with the helicoid 44*a* of the rotary barrel 44. Meanwhile, at a circumferential surface of the front cylinder 45*b*, three key grooves 45*d* are formed so as to be parallel to an optical-axis direction. The key groove 45*d* engages with a straight key 41*a*, which is a projection formed on the upper cover 41. Thus, when the rotary barrel 44 is rotated, the straight key 41*a* prevents the lens holder 45 from rotating and the lens holder 45 is moved in the optical-axis direction.

The lens holder 45 contains the taking lens 23 as described above. The taking lens 23 is constituted by three lenses of a first lens 23*a*, a second lens 23*b* and a third lens 23*c*. As the lens holder 45 is moved in the optical-axis direction by rotating the rotary barrel 44, the talking lens 23 is integrally moved in the optical-axis direction between a close-end position (shown in FIG. 4) and an infinity-end position (shown in FIG. 5). Incidentally, while the taking lens 23 moves from the close-end position to the infinity-end position, the rotary barrel 44 makes two rotations. The lens driving device 40 detects an original position of the taking lens 23 in order to control the position of the taking lens 23. The original-position detection of the taking lens 23 is described below.

The circumferential surface of the front cylinder 45*b* is provided with a reflection member 70 disposed at a lower portion thereof. A surface of this reflection member 70 is a mirror surface, for example. The lens holder 45 is formed from a block plastic, for example. Thus, the surface of the reflection member 70 has a different reflectance relative to the surrounding portion thereof.

In the meantime, a sidewall of the upper cover 41 is provided with an opening 41*b* formed at a position confronting the reflection member 70 at a time when the taking lens 23 is kept in the close-end position (shown in FIG. 4). Further, a photo reflector 71 (hereinafter, called as PR) being as an optical position detector is disposed so as to be adjacent to the opening 41*b*. The PR is an optical sensor in which a light-emitting element 71*a* and a light-receiving element 71*b* are disposed in parallel and are contained in one package. The PR detects an object and a position thereof by sensing the light emitted from the light-emitting element 71*a* and reflected by the object.

The PR 71 optically detects the reflection member 70 via the opening 41*b* on the basis of the deference of the reflectance when the taking lens 23 is moved to the close-end position being as the original position, namely when the lens holder 45 is moved to the position shown in FIG. 4. In other words, the PR 71 detects the original position and outputs a detection signal when the taking lens 23 is moved to the close-end position (shown in FIG. 4) by moving the lens holder 45 forward in the optical-axis direction.

In this way, it is sufficient to dispose the reflection member 70 on the circumference of the lens holder 45. Thus, the lens driving device 40 may be downsized in comparison with a case in that an optical-position detector of the PR and so forth is disposed inside the upper and lower covers 41 and 42 to detect the original position of the taking lens 23. Moreover, since it is sufficient to merely form the opening 41*b* at a part of the upper cover 41, strength of the upper cover 41 is prevented from deteriorating.

Figure 8:
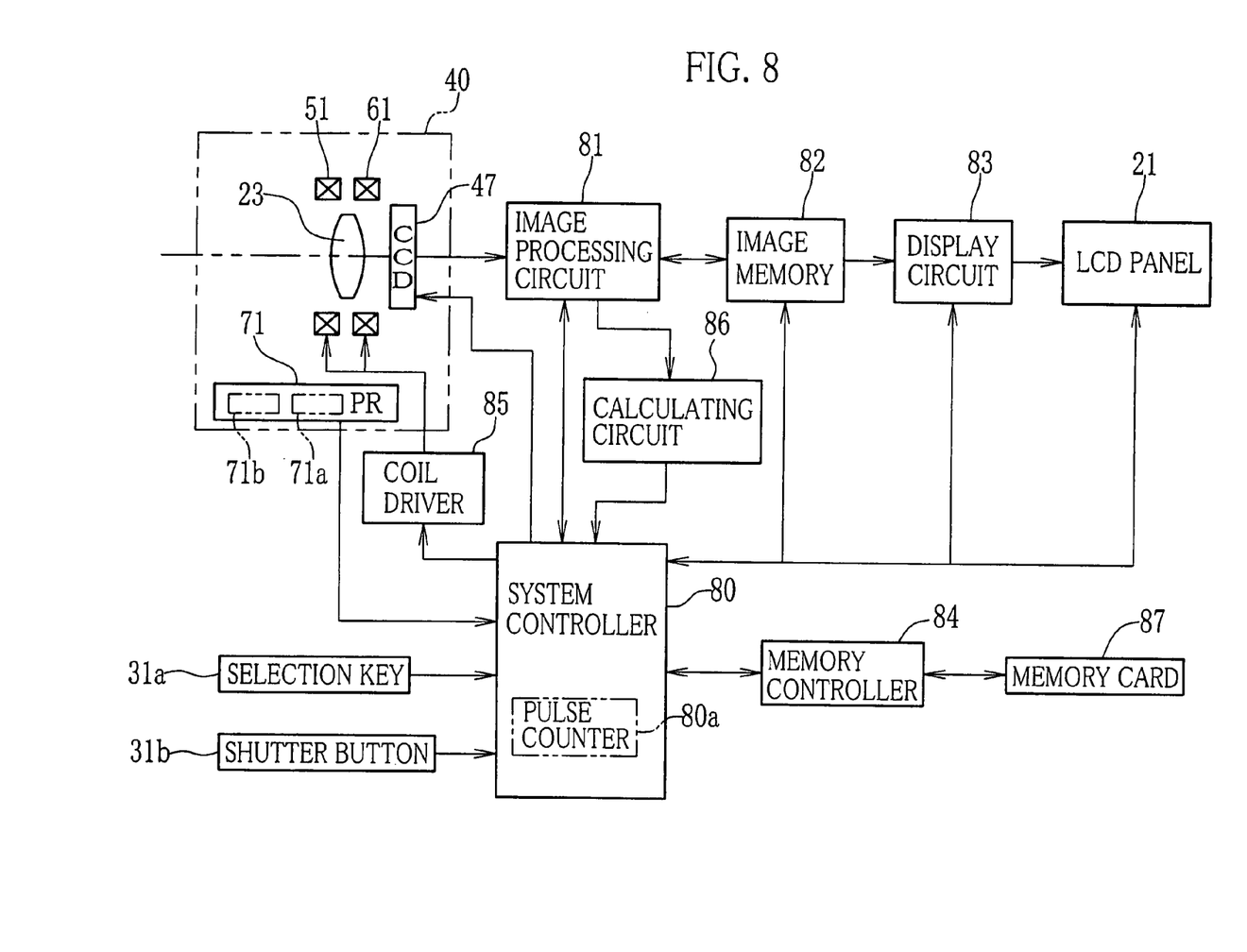
FIG. 8 is a block diagram showing an electrical structure of a camera function of the camera-equipped cell-phone.

Next, an electric structure of a camera function of the camera-equipped cell-phone 10 is described below. FIG. 8 is a block diagram showing the electric structure of the camera function. A system controller 80 controls the whole of the camera-equipped cell-phone 10. The selection key 31*a* and the shutter button 31*b* are connected to the system controller 80. When a user operates the selection key 31*a*, the system controller 80 performs processing in accordance with the respective operations. For instance, when a shooting mode is set by operating the selection key 31*a*, the system controller 80 controls each section to keep a shootable state. When the user has operated the shutter button 31*b*, the system controller 80 controls each section to execute a shooting process.

The CCD 47 takes a subject image formed by the taking lens 23 to capture image data. The CCD 47 is connected to the image processing circuit 81 to output the image data thereto. The image processing circuit 81 is connected to an image memory 82 to store the image data. When the image memory 82 stores the image data, the image processing circuit 81 converts the analog image date into digital image data. Further, the image processing circuit 81 performs varied correction processing, YC processing, compression processing and so forth. As to the correction processing, there are brightness-level correction, white-balance correction and so forth.

When displaying a through-image on the LCD panel 21, the image processing circuit 81 performs the varied correction processing for the image data, and after that, the image processing circuit 81 performs the simple YC processing to convert the image data into YC image data including brightness data and color-difference data. The YC image data is transferred from the image memory 82 to a display circuit 83 wherein the YC image data is converted into a composite signal of NTSC and so forth. The composite signal is outputted to the LCD panel 21.

When shooting has been carried out, the image processing circuit 81 performs the varied correction processing for the image data, and after that, the image processing circuit 81 performs the regular YC processing to produce the YC image data. Successively, the compression processing is performed to convert the YC image data into the compressed image data of JPEG format, for example.

The system controller 80 is connected to a memory controller 84, a coil driver 85, the PR 71 and an AF-evaluation-value calculating circuit 86. The system controller 80 controls the memory controller 84 to store the compressed image data in a memory card 87.

Further, the system controller 80 outputs a drive signal to the coil driver 85 to generate the pulse current. The coil driver 85 supplies the pulse current to the respective coils 51 and 61 to move the taking lens 23 in the optical-axis direction, such as described above.

The PR 71 outputs the detection signal to the system controller 80 when the taking lens 23 is moved to the original position. The system controller 80 includes a pulse counter 80*a* for counting a pulse number of the pulse current supplied to the respective coils 51 and 61. The system controller 80 resets the pulse counter 80*a* to zero when the detection signal has been inputted. On the basis of the count data of the pulse counter 80*a*, the system controller 80 outputs the drive signal to the coil driver 85 to control the position of the taking lens 23.

The AF-evaluation-value calculating circuit 86 obtains the image data of a prescribed area of a picture frame from the image processing circuit 81 to calculate an AF evaluation value on the basis of contrast of the obtained image data. The contrast of the image is highest when the subject image is kept in a focused state. At this time, the AF evaluation value is also highest. The AF-evaluation-value calculating circuit 86 outputs an AF-evaluation-value signal to the system controller 80 in accordance with the AF evaluation value. On the basis of the AF-evaluation-value signal, the system controller 80 controls the position of the taking lens 23 to move the taking lens 23 to a focus position.

Figure 9:
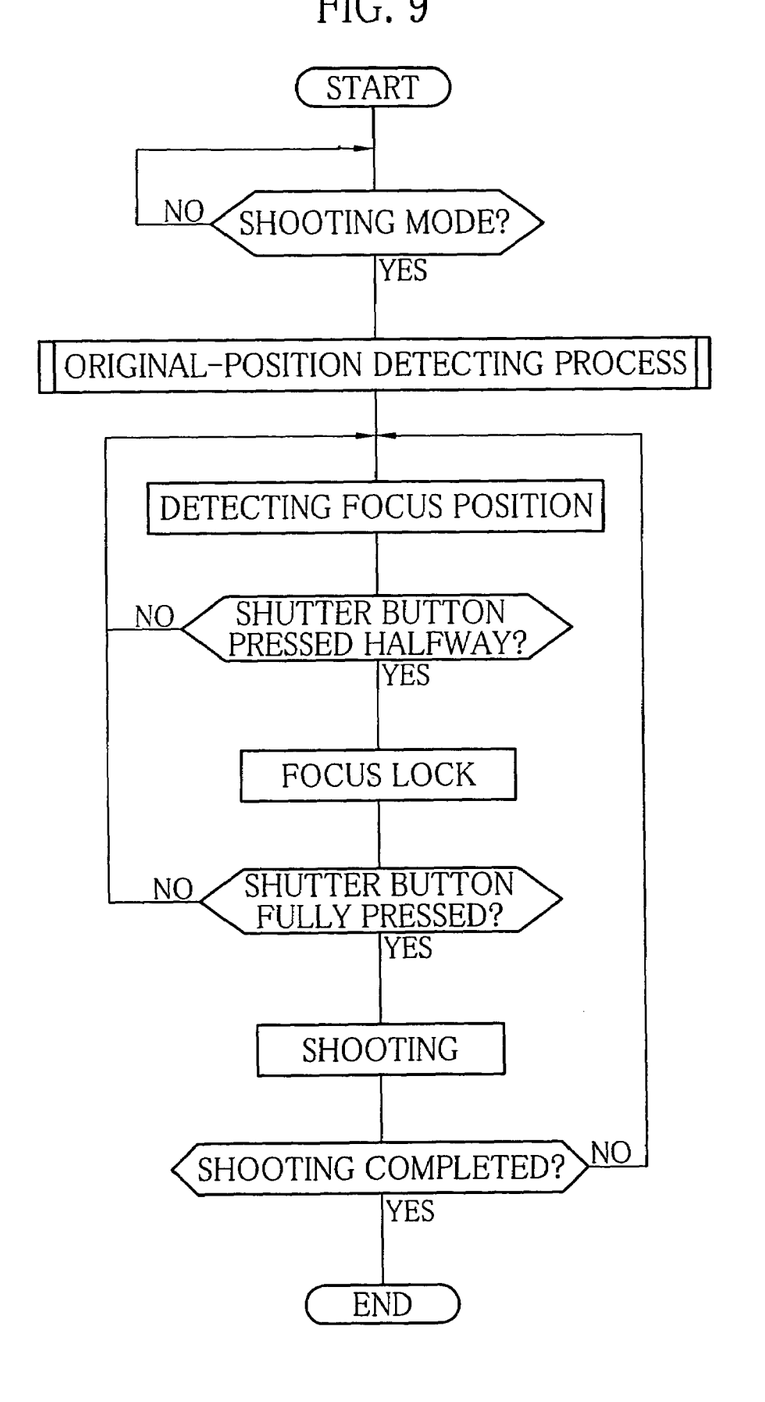
FIG. 9 is a flowchart of a shooting process.
Figure 10:
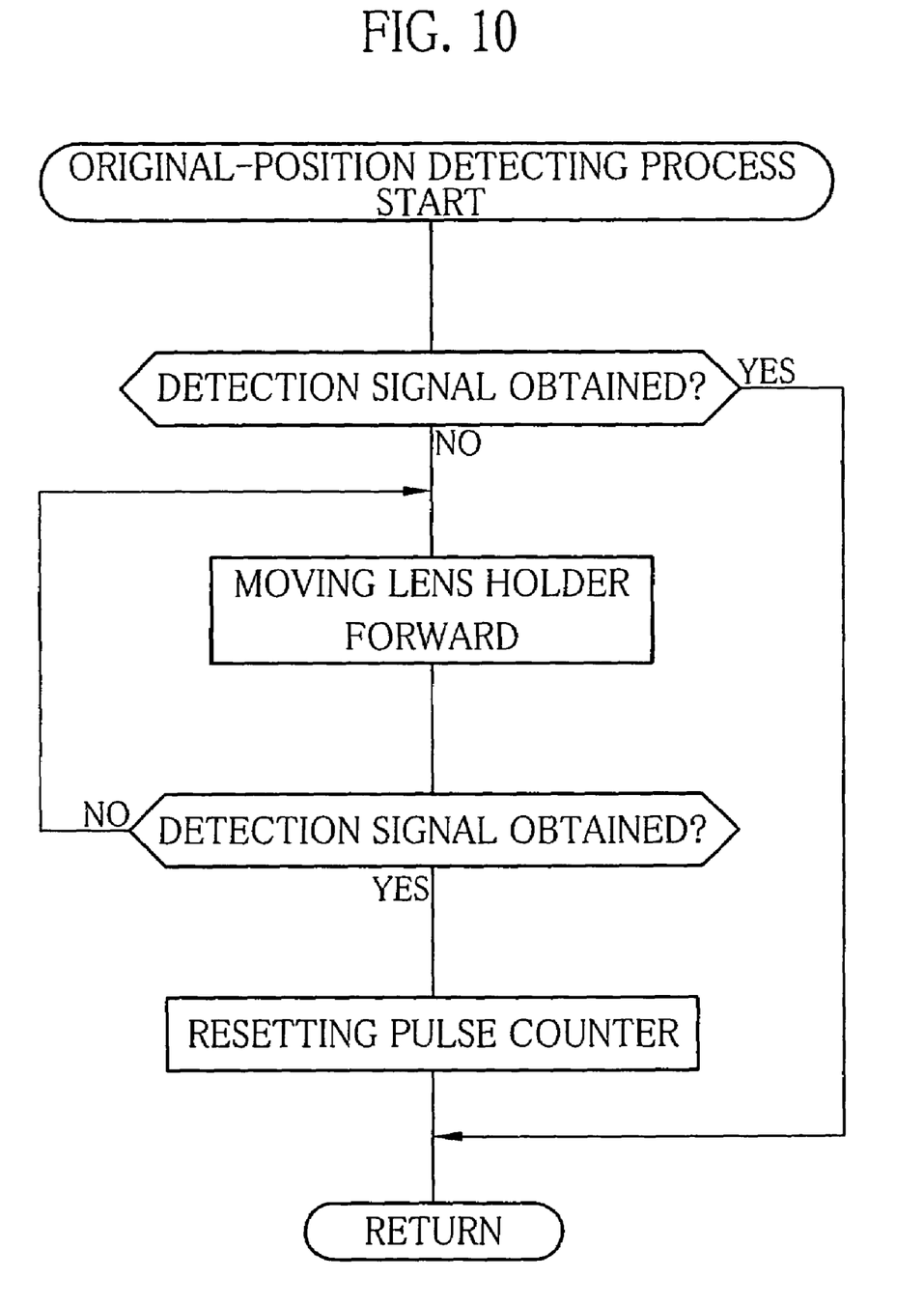
FIG. 10 is a flowchart of an original-position detecting process.

Next, the shooting process of the camera-equipped cellphone 10 is described below, referring to flowcharts shown in FIGS. 9 and 10. The system controller 80 judges whether the shooting mode is set or not. When the shooting mode is not set, the system controller 80 keeps the camera function in an OFF-state. When the shooting mode is set, the system controller 80 turns on the camera function, namely activates the respective sections for working the camera function. After that, the system controller 80 performs an original-position detecting process.

The original-position detecting process is described below. The system controller 80 judges whether or not the PR 71 outputs the detection signal. When it is judged that the detection signal is outputted, the taking lens 23 is kept in the original position and the pulse counter 80*a* is reset. Consequently, the original-position detecting process terminates.

When it is judged that the detection signal is not outputted, the taking lens 23 is moved toward the close-end position (shown in FIG. 4). At this time, the controller 80 repeatedly judges whether or not the PR 71 outputs the detection signal. When it is judged that the detection signal is not outputted, the taking lens 23 is further moved toward the close-end position. When it has been judged that the detection signal is outputted, moving the taking lens 23 is stopped. After that, the pulse counter 80*a* is reset to complete the original-position detecting process.

After completing the original-position detecting process, a focus-position detecting process of the taking lens 23 is performed. The system controller 80 obtains the AF-evaluation-value signal from the calculating circuit 86 while controlling the coil driver 85 to move the taking lens 23 in the optical-axis direction. On the basis of the AF-evaluation-value signal and the count data of the pulse counter 80*a*, the system controller 80 controls the coil driver 85 to move the taking lens 23 to the focus position.

The system controller 80 judges whether or not the shutter button 31*b* is pressed halfway. When it is judged that the shutter button 31*b* is not pressed halfway, the focus-position detecting process of the taking lens 23 is repeated until the shutter button 31*b* is pressed halfway. When it has been judged that the shutter button 31*b* is pressed halfway, the taking lens 23 is fixed to the focus position to lock a focus.

After that, the system controller 80 judges whether or not the shutter button 31*b* is fully pressed. When the shutter button 31*b* has been freed without being fully pressed, the lock of the focus is released and the focus-position detecting process is performed again. Meanwhile, when the shutter button 31*b* has been fully pressed, the system controller 80 controls the memory controller 84 to store the image data in the memory card 87.

After that, the system controller 80 terminates the shooting process if the shooting mode is changed to the other mode. When the shooting mode is not changed, the system controller 80 performs the focus-position detecting process again.

In the above embodiment, the original position is defined as the close-end position of the taking lens 23. However, this is not exclusive. The original position may be defined as the infinity-end position of the taking lens 23. In this case, the reflection member 70 is disposed at a rear side of the circumferential surface of the main cylinder 45*a*. Moreover, the opening is formed in the lower cover 42 at a position confronting the reflection member 70 at a time when the taking lens 23 is kept in the infinity-end position. The PR 71 is disposed so as to be adjacent to this opening.

In a case that the reflection member 70 is disposed at a position covered with the rotary barrel 44 at a time when the taking lens 23 is kept in the original position, an opening is formed at a corresponding position of the rotary barrel 44. In this case, the PR 71 optically detects the reflection member 70 via the opening 41*b* and the opening formed in the rotary barrel 44. Further, in the foregoing embodiment, the reflection member 70 is disposed on the circumference of the lens holder 45. However, this is not exclusive. A reflective surface having different reflectance may be formed at a part of the circumferential surface of the lens holder 45 by means of plating and so forth.

In the foregoing embodiment, the lens driving device 40 utilizes the hollow stepping motor. However, this is not exclusive. A normal stepping motor and a DC motor may be used to rotate the rotary barrel 44 via a gear train.

Furthermore, in the foregoing embodiment, the present invention is applied to the camera-equipped cell-phone. However, this is not exclusive. The present invention may be applied to a normal electronic camera.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens driving device for moving a lens in an optical-axis direction thereof to detect a predetermined original position of said lens, said lens driving device comprising:
    a lens holder for holding said lens, said lens holder having a cylindrical shape and integrally moving with said lens;
    a rotary barrel disposed so as to cover a circumferential surface of said lens holder, said rotary barrel being rotated around an optical axis of said lens to move said lens holder in said optical-axis direction;

a barrel holder for rotatably holding said rotary barrel from an outer side thereof;

a reflection member disposed on the circumferential surface of said lens holder, said reflection member having different reflectance relative to a surrounding portion thereof;

an opening formed in said barrel holder, said opening being formed at a position confronting said reflection member at a time when said lens is set to said original position; and an optical position detector disposed so as to be adjacent to said opening, said optical position detector optically detecting said reflection member via said opening when said lens has reached the original position.

2. The lens driving device according to claim 1, wherein said rotary barrel has an auxiliary opening formed at a position confronting said reflection member in a case that said reflection member is covered with said rotary barrel at the time when said lens is set to said original position.

3. The lens driving device according to claim 1, further comprising:
   a stator held by said barrel holder and having a cylindrical shape, said stator generating magnetic fields therein; and
   a magnet disposed on a circumferential surface of said rotary barrel, said magnet being integrally rotated with said rotary barrel by the magnetic fields of said stator.

4. The lens driving device according to claim 3, wherein said rotary barrel has a first helicoid, which is formed on an inner surface of said rotary barrel to mesh with a second helicoid formed on an outer surface of said lens holder, and said lens holder is moved in the optical-axis direction by said first and second helicoids upon rotation of said rotary barrel.

5. The lens driving device according to claim 4, wherein said lens holder comprises a main cylinder on which said second helicoid is formed, and a front cylinder integrally formed with a front side of said main cylinder, said front cylinder having a smaller diameter in comparison with said main cylinder.

6. The lens driving device according to claim 5, wherein said reflection member is disposed on a circumferential surface of said front cylinder.

7. The lens driving device according to claim 1, wherein said optical position detector includes a light-emitting element and a light-receiving element, and receives the light, which is emitted from said light-emitting element and reflected by said reflection member, to detect said reflection member on the basis of difference of the reflectance.

8. The lens driving device according to claim 7, wherein said lens moves in the optical-axis direction from a first position to a second position, said original position is either of said first and second positions.

9. An electronic camera including a lens driving device for moving a lens, which forms a subject image, in an optical-axis direction thereof to detect a predetermined original position of said lens, an imaging device for obtaining image data by taking said subject image, and a memory for storing said image data obtained by said imaging device, said lens driving device comprising:
   a lens holder for holding said lens, said lens holder having a cylindrical shape and integrally moving with said lens;
   a rotary barrel disposed so as to cover a circumferential surface of said lens holder, said rotary barrel being rotated around an optical axis of said lens to move said lens holder in said optical-axis direction;
   a barrel holder for rotatably holding said rotary barrel from an outer side thereof;
   a reflection member disposed on the circumferential surface of said lens holder, said reflection member having different reflectance relative to a surrounding portion thereof;
   an opening formed in said barrel holder, said opening being formed at a position confronting said reflection member at a time when said lens is set to said original position; and
   an optical position detector disposed so as to be adjacent to said opening, said optical position detector optically detecting said reflection member via said opening when said lens has reached the original position.

10. The electronic camera according to claim 9, wherein said imaging device is a CCD held by said barrel holder.

11. The electronic camera according to claim 10, further comprising:
    a low-pass filter disposed in front of said CCD to remove high-frequency components included in a subject light, said low-pass filter being also held by said barrel holder.

12. The electronic camera according to claim 11, wherein said CCD and said low-pass filter are disposed so as to confront a rear end of said lens holder.

* * * * *